US010533523B2

(12) United States Patent
Roz et al.

(10) Patent No.: US 10,533,523 B2
(45) Date of Patent: Jan. 14, 2020

(54) DEVICE FOR PRESSURIZING PROPELLANT TANKS OF A ROCKET ENGINE

(71) Applicant: SNECMA, Paris (FR)

(72) Inventors: Gérard Roz, Pressagny l'Orgueilleux (FR); Lauren Nguyen Duc, Paris (FR); Stéphanie Dreyer, Vernon (FR); Nicolas Ravier, Vernon (FR)

(73) Assignee: ARIANEGROUP SAS, Paris (FR)

( * ) Notice: Subject to any disclaimer, the term of this patent is extended or adjusted under 35 U.S.C. 154(b) by 904 days.

(21) Appl. No.: 14/909,894

(22) PCT Filed: Jul. 25, 2014

(86) PCT No.: PCT/FR2014/051941
§ 371 (c)(1),
(2) Date: Feb. 3, 2016

(87) PCT Pub. No.: WO2015/019000
PCT Pub. Date: Feb. 12, 2015

(65) Prior Publication Data
US 2016/0177874 A1 Jun. 23, 2016

(30) Foreign Application Priority Data
Aug. 6, 2013 (FR) ...................................... 13 57808

(51) Int. Cl.
*F02K 9/50* (2006.01)
*F02K 9/94* (2006.01)
F02K 9/97 (2006.01)

(52) U.S. Cl.
CPC .................. *F02K 9/50* (2013.01); *F02K 9/94* (2013.01); *F02K 9/972* (2013.01)

(58) Field of Classification Search
CPC ............... F02K 9/48; F02K 9/50; F02K 9/972
See application file for complete search history.

(56) References Cited

U.S. PATENT DOCUMENTS 2,701,441 A    2/1955   Mitchell
3,098,353 A *   7/1963   Abild .................... F02K 9/50
                                                          60/240

(Continued)

FOREIGN PATENT DOCUMENTS

FR    2 197 117       3/1974
FR    2 877 403 A1   5/2006

(Continued)

OTHER PUBLICATIONS

Space Shuttle Main Engine—Wikipedia webpage [//en.wikipedia.org/wiki/Space_Shuttle_main_engine accessed on Nov. 9, 2018].*

(Continued)

*Primary Examiner* — Lorne E Meade
(74) *Attorney, Agent, or Firm* — Bookoff McAndrews, PLLC

(57) ABSTRACT

The device comprises two heat exchangers (74, 90) suitable respectively for vaporizing first and second propellants before they are reintroduced in gaseous form into their tanks (16, 18). The heat exchangers co-operate respectively with first and second gas generators (60, 84) suitable for being fed with a mixture of propellants in order to produce combustion, the second gas generator (84) being suitable for being fed at least in part by the exhaust from the first gas generator (60).

12 Claims, 2 Drawing Sheets

(56) References Cited

U.S. PATENT DOCUMENTS

Figure 1:
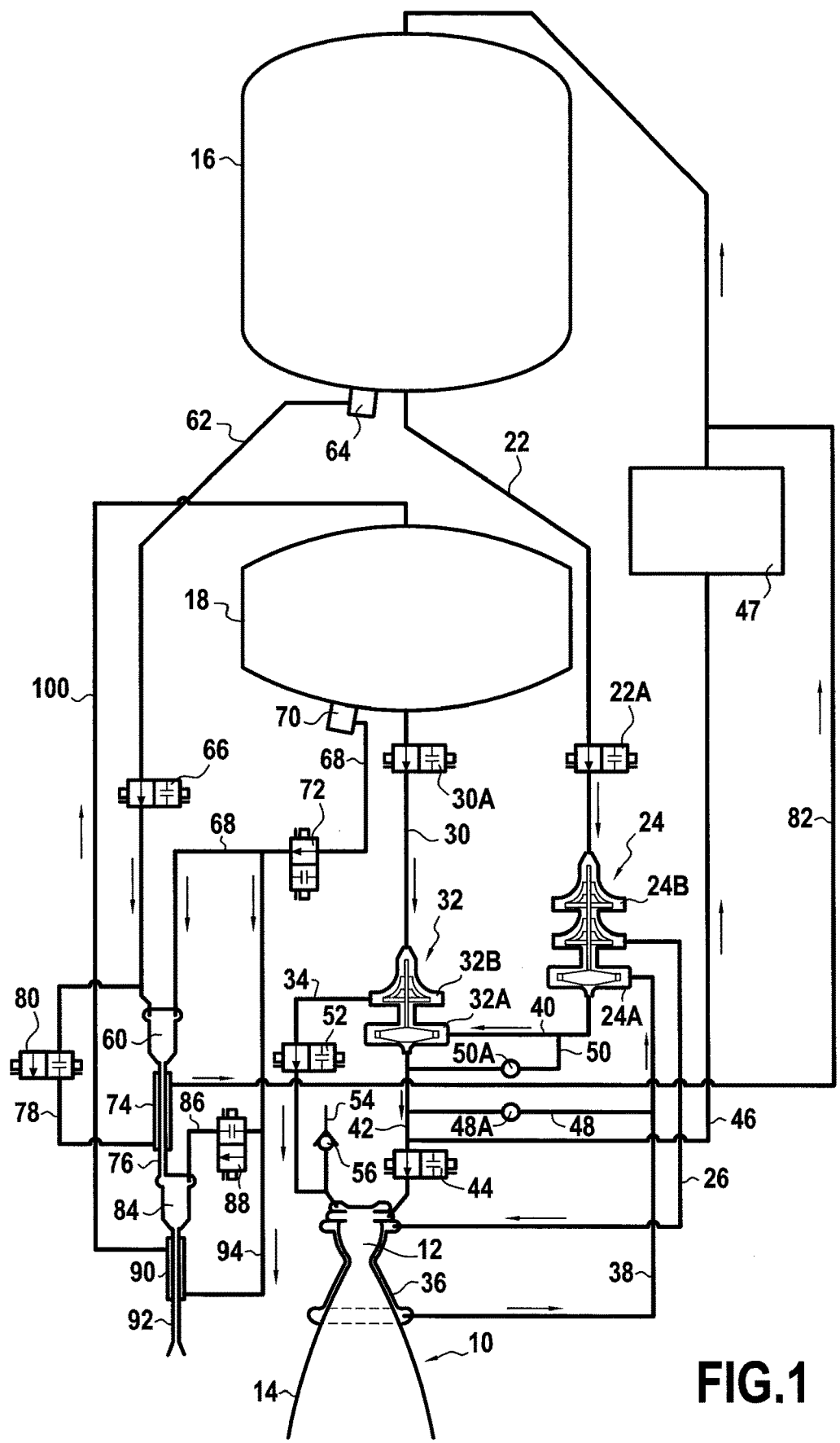

| | | | | |
|---|---|---|---|---|
| 3,102,388 | A * | 9/1963 | Abild | F02K 9/50 60/224 |
| 3,136,121 | A * | 6/1964 | Barger | F02K 9/50 60/259 |
| 3,224,189 | A * | 12/1965 | Kenny | B64G 1/402 60/204 |
| 3,516,251 | A * | 6/1970 | Andrews | F02K 9/44 60/258 |
| 3,597,923 | A * | 8/1971 | Simon | F02K 9/44 60/260 |
| 5,481,869 | A * | 1/1996 | Pahl | F02K 9/50 60/259 |
| 5,636,513 | A * | 6/1997 | Pahl | F02K 9/50 60/204 |
| 5,918,460 | A * | 7/1999 | Connell | F02K 9/566 60/257 |
| 6,226,980 | B1 * | 5/2001 | Katorgin | F02K 9/48 60/258 |
| 6,581,882 | B2 * | 6/2003 | Valentian | B64G 1/401 244/158.4 |
| 7,477,966 | B1 * | 1/2009 | Mango | B64G 1/401 60/250 |
| 7,762,498 | B1 | 7/2010 | Henderson et al. | |
| 9,446,862 | B2 * | 9/2016 | Barthoulot | B64G 1/401 |

FOREIGN PATENT DOCUMENTS

| | | |
|---|---|---|
| GB | 1 439 535 | 6/1976 |
| JP | S49-108414 A | 10/1974 |
| RU | 2133865 C1 | 7/1999 |
| RU | 2143579 C1 | 12/1999 |
| RU | 2407907 C1 | 12/2010 |
| WO | WO 2012/172238 A1 | 12/2012 |
| WO | WO 2013/088030 | 6/2013 |

OTHER PUBLICATIONS

Space Shuttle External Tank—Wikipedia webpage [//en.wikipedia.org/wiki/Space_Shuttle_external_tank accessed on Nov. 9, 2018].*

Space Shuttle Main Engine Orientation, Rocketdyne Propulsion & Power, BC98-04, Jun. 1998, pp. 1-105.*

English Translation of Search Report dated Sep. 19, 2014, in corresponding International PCT Application No. PCT/FR2014/051941, filed on Jul. 25, 2014 (2 pages).

Official Action and Search Report (and English Translation thereof) dated Mar. 15, 2018, in corresponding Russian Application 2016107834, filed on Jul. 25, 2014 (5 pages).

Official Action (English Translation) dated Aug. 28, 2018, in corresponding Japanese Application 2016-532717 (3 pages).

* cited by examiner

DEVICE FOR PRESSURIZING PROPELLANT TANKS OF A ROCKET ENGINE

CROSS-REFERENCE TO RELATED APPLICATIONS

This application is the U.S. national phase entry under 35 U.S.C. § 371 of International PCT Application No. PCT/FR2014/051941, filed on Jul. 25, 2014, which claims priority to French Patent Application No. FR 1357808, filed on Aug. 6, 2013, the entireties of each of which are incorporated by reference herein.

The present invention relates to a device for pressurizing propellant tanks of a rocket engine, the device comprising a first heat exchanger suitable for vaporizing a first propellant coming from a first tank prior to being reintroduced into the first tank, and a second heat exchanger suitable for vaporizing a second propellant coming from a second tank prior to being reintroduced into the second tank.

The engine is usually an engine in which the gas from the combustion chamber is exhausted via a nozzle so as to develop thrust.

For example, the first propellant is a fuel, such as hydrogen or methane, while the second propellant is an oxidizer, such as oxygen.

The propellants are stored in the tanks while in the liquid state, and the tanks are maintained under pressure so as to ensure that the flows of the propellants to the engine are regular. For that purpose, a certain amount of each propellant is tapped from its tank so as to pass through a heat exchanger where it is heated and vaporized, prior to being reinjected in the gaseous state into its own tank so as to form a blanket of gaseous propellant under pressure in each tank.

Such a propulsion assembly is generally designed to operate in "propulsion" stages of flight during which the engine develops thrust suitable for propelling the rocket, and "ballistic" stages during which the engine is off, so that the rocket is subjected only to the laws of ballistics.

The first portion of the flight is a propulsion stage, during which high thrust is needed in order to put the rocket into orbit. Thereafter, for orbital maneuvers and in order to return to earth, propulsion stages alternate with ballistic stages, and a small amount of thrust suffices that is applied over relatively short periods of time.

Nevertheless, it is important for the engine to be capable of restarting quickly and under good conditions at the end of a ballistic stage. That means in particular that, even during a ballistic stage, when the engine is not active, sufficient pressure needs to be ensured in the liquid propellant tank for it to be possible to obtain the flow rate needed for restarting the engine immediately. In other words, it is important to vaporize small amounts of the two propellants and to reinject them into the tanks, even during a ballistic stage, while the engine is inactive.

It is also important to ensure that the propellants are vaporized without significantly degrading the efficiency of the engine.

The invention thus seeks to propose a device that is suitable for pressurizing the two propellant tanks by reinjecting vaporized propellants into those tanks, while nevertheless preserving the energy efficiency of the engine.

This object is achieved by the fact the first and second heat exchangers co-operate respectively with first and second gas generators suitable for being fed with a mixture of propellants in order to produce combustion, and by the fact that the second gas generator is suitable for being fed at least in part by the exhaust from the first gas generator.

Thus, the first gas generator can be fed with a mixture of propellants for heating and vaporizing the first propellant, and the second gas generator can be fed with the mixture of propellants in order to heat and vaporize the second propellant. It can be understood that the operation of these gas generators is independent of the operation of the rocket engine. Consequently, both propellants can be heated and vaporized even during a ballistic stage, while the rocket engine is inactive.

Furthermore, insofar as the second gas generator is fed at least in part by the exhaust from the first gas generator, it is ensured that the propellants that do not participate in combustion in the first gas generator are used in the second gas generator for its own combustion, thereby maximizing the efficiency of heat exchange.

In an embodiment, the device includes means for pressurizing the propellants feeding the gas generators. In particular, these means comprise first and second motor-driven pumps respectively situated at the outlets from the first and second tanks.

In an embodiment, the device further comprises a regenerative heat exchange circuit suitable for using the combustion heat from the engine to vaporize one of the propellants, referred to as the "regenerated" propellant, and it includes means for setting up a first situation in which the first gas generator is fed by the first and second tanks, while the feed to the second heat exchanger for vaporizing the regenerated propellant is deactivated and the feed of the heat exchanger for vaporizing the propellant other than the regenerated propellant is activated.

Under such circumstances, provision may be made, in the first situation, for the second gas generator to be fed solely by the exhaust of the first gas generator.

By way of example, the regenerated propellant is the first propellant.

The regenerative heat exchange circuit may be used for heating and vaporizing the regenerated propellant during propulsion stages, while the rocket engine is active. Under such circumstances, during propulsion stages, only the other propellant is heated and vaporized using the heat exchanger dedicated thereto.

In the first situation, only the first gas generator produces heat. If the regenerated propellant is the second propellant then, during propulsion stages, it is the first heat exchanger that is fed with the first propellant, which is heated directly by the first gas generator. Nevertheless, when the regenerated propellant is the first propellant, only the second heat exchanger is fed with propellant, and the second propellant is heated and vaporized therein by the heat given off by the first gas generator, which heats the exhaust from the first gas generator with which the second heat exchanger co-operates via the second gas generator that is fed with the exhaust.

It is possible for the device to include means for setting up a second situation in which the first gas generator is fed by the first and second tanks, the second gas generator is fed by the exhaust of the first gas generator and by the second tank, and the feeds of the first and second heat exchangers are activated.

Thus, in order to make the second gas generator operate, it suffices to inject the second propellant into the exhaust fluid from the first gas generator, which fluid contains a sufficient quantity of the first propellant to produce combustion of the resulting mixture. Specifically, the first gas generator is initially fed with a mixture of propellant in which the first propellant (in particular hydrogen) is in excess relative to stoichiometric proportions.

The first gas generator may be fed by a first feed pipe and by a second feed pipe respectively connected to the first and second tanks, while the second gas generator is fed firstly by an exhaust pipe of the first gas generator and secondly by a third feed pipe connected to the second tank.

Under such circumstances, provision may be made for the third feed pipe to be a branch connection on the second feed pipe.

Provision may also be made for the third feed pipe to be connected to the second feed pipe via a branch valve.

Figure 2:
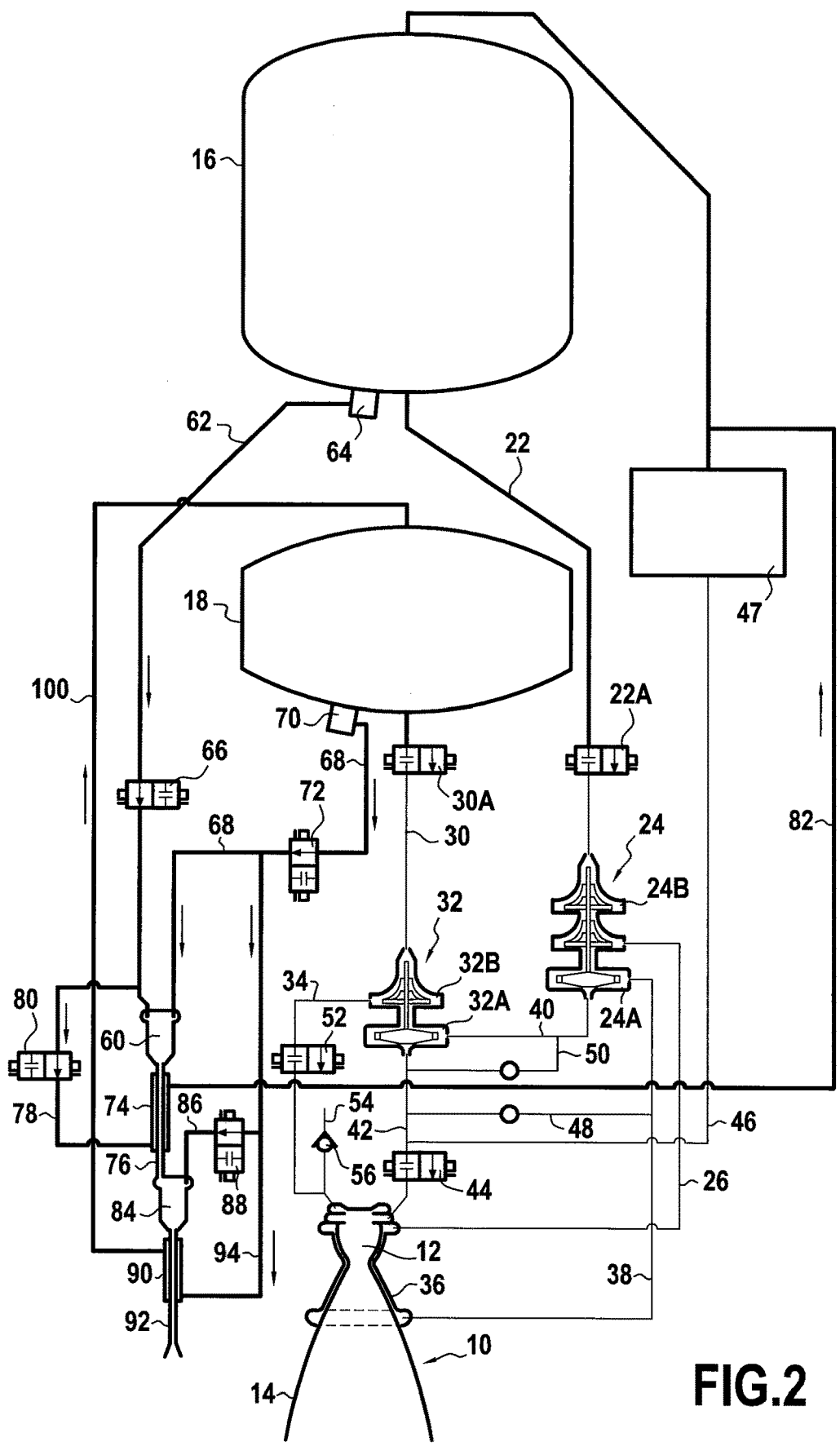

The invention can be well understood and its advantages appear better on reading the following detailed description of an embodiment shown by way of non-limiting example. The description refers to the accompanying drawings, in which:

FIG. 1 is a diagrammatic view of a propulsion assembly comprising a rocket engine and a pressurizer device of the invention, the engine being in a propulsion stage; and FIG. 2 shows the FIG. 1 propulsion assembly, while the engine is in a ballistic stage.

The propulsion assembly shown in the figures comprises a rocket engine 10 having a combustion chamber 12 and a nozzle 14 presenting a diverging portion. The combustion chamber is fed with propellant from a first tank 16 containing a first propellant, firstly a reducing propellant such as hydrogen or methane, and it is also fed with a second propellant from a second tank 18 containing an oxidizer propellant, in particular oxygen. The reducing propellant acts as fuel, while the oxidizer propellant oxidizes combustion.

The first propellant is fed from the first tank via a first main feed pipe 22 delivering to a first turbopump 24, and a first injection pipe 26 connected to the outlet of the first turbopump 24. The second propellant is fed via a second main pipe 30 delivering into a second turbopump 32, and a second injection pipe 34 connecting the outlet from the second turbopump 32 to the combustion chamber. Specifically, the first turbopump 24 is a two-stage pump, while the second turbopump 32 is a single-stage pump.

Authorization valves 22A and 30A are arranged in the main feed pipes 22 and 30.

Specifically, the engine 10 is of the expander type, i.e. it is an engine in which a first propellant is taken and vaporized in order to supply energy to certain portions of the propulsion assembly. More precisely, the injection pipe 26 delivers into a heater 36 that co-operates with the wall of the combustion chamber 12 so that during a propulsion stage it heats the first propellant flowing through the heater, thereby vaporizing it. At the outlet from the heater 36, the first propellant is taken by a feed pipe 38 to the turbine portion 24A of the first turbopump 24 in order to drive its turbine so as to actuate its pump portion 24B. At the outlet from the turbine portion 24A, the first propellant is taken by a feed pipe 40 to the inlet of the turbine portion 32A of the second turbopump 32 in order to drive its turbine so as to actuate its pump portion 32B. At the outlet from the turbine portion 32A, the first propellant is taken to the inlet of the combustion chamber 12 by an injection pipe 42. An isolation valve 44 is arranged in the injection pipe 42, which is connected to the first tank 16 via a pressurization and expansion valve 47. Thus, the vaporized first propellant returns to the tank 16 where it forms a blanket of gas at a pressure that can be adjusted by the system 47.

Thus, the propulsion assembly includes a heat exchange regenerative circuit that uses the heat of combustion from the engine 10 to vaporize the first propellant. This heat exchange regenerative circuit comprises the heater 36 and the pipes 38, 40, 42, and 46. A bypass pipe 48 with a stop valve 48A is arranged between the pipes 38 and 42 in order to bypass the inlets of the turbine. Another bypass pipe 50 with a stop valve 50A is arranged between the outlet from the turbine portion of the first turbopump 24 and the injection pipe 42 in order to bypass the turbine portion 32A of the second turbopump 32.

The second propellant is injected directly by the injection pipe 34 that extends between the outlet of the second turbopump 32 and the inlet of the combustion chamber 12. An isolation valve 52 is arranged in the pipe 34 to authorize or stop the injection flow.

The figures show a pipe segment 54 having a check valve 56. This pipe segment 54 may be connected to a feed of neutral fluid, e.g. helium, in order to prevent the first propellant penetrating into the second propellant injection cavity when starting the engine 10. The check valve 56 allows only the neutral fluid to flow in the direction going towards the combustion chamber 12. The propulsion assembly has a first gas generator 60 that is fed with first propellant by a first feed pipe 62 connected to the first tank 16 via a first motor-driven pump 64 or the like. A feed valve 66 is arranged in the first feed pipe 62. The first gas generator 60 is fed with second propellant by a second feed pipe 68 connected to the second tank 18 via a second motor-driven pump 70 or the like. A second feed valve 72 is arranged in the second feed pipe. A first heat exchanger 74 co-operates with the first gas regenerator. By way of example, this first heat exchanger may comprise a double-walled tube arranged around the exhaust 76 from the first gas generator. This first heat exchanger may be fed with first propellant by a first exchange pipe 78 connected to the tank 16. Specifically, this first exchange pipe 78 is a first tapping pipe that is connected to the first feed pipe 62. Specifically, the first tapping pipe 78 is connected to the first feed pipe 62 via a tapping valve 80 that may be opened or closed to authorize or prevent the first heat exchanger being fed with first propellant. The outlet from the first heat exchanger 74 is connected to the first tank 16 by a return pipe 82 so that the first propellant vaporized in the first heat exchanger 74 is reinjected into the gas blanket in the first tank 16. Specifically, the return pipe 82 is connected to the pipe 46 downstream from the valve system 47.

The propulsion assembly also has a second gas generator 84 that is fed firstly by the exhaust 76 from the first gas generator and secondly by a third feed pipe 86 that is connected to the second tank 18. Specifically, the third feed pipe is connected to the second feed pipe 68 via a branch valve 88.

A second heat exchanger 90 co-operates with the second gas generator 84 to vaporize the second propellant. By way of example, the second heat exchanger may be formed by a double-walled tube that co-operates with the exhaust 92 from the second heat exchanger, and in which the second propellant can flow. For this purpose, the second heat exchanger 90 may be fed by a second tapping pipe 94 connected to the second feed pipe 68. Specifically, this connection is made downstream from the feed valve 72, and the third feed pipe 86 is itself in the form of a tapping from the pipe 94 via the branch valve 88.

The output from the second heat exchanger 90 is connected to the second tank 18 by a third return pipe 100 so that the second propellant vaporized in the second heat exchanger is fed to the gas blanket of the second tank 18.

In the situation shown in FIG. 1, the engine 10 is in a propulsion stage. In this situation, the feed valves 66 and 72 are open while the tapping valve 80 and the branch 88 are closed. Thus, the first gas generator 60 is fed with the first and second propellants, and is thus put into operation. Nevertheless, the first heat exchanger 74 is not fed with first propellant. Thus, as mentioned above, the first propellant is vaporized by the regenerative circuit. Simultaneously, the second heat exchanger 90 is fed with second propellant by the tapping pipe 94. The second gas generator 84 is arranged in series with the first gas generator 60, i.e. the exhaust from the first gas generator delivers to the inlet of the second gas generator. Insofar as the first heat exchanger 74 is not fed with propellant, the exhaust fluid from the first gas generator reaches the second gas generator in the hot state. Nevertheless, the second gas generator is not fed with second propellant since the valve 88 is closed. Thus, new combustion does not occur in the second gas generator, but the exhaust from the first gas generator delivers directly towards the exhaust 92 from the second gas generator. Insofar as the second heat exchanger 90 is fed with second propellant, the second propellant is thus vaporized in spite of there being no combustion in the second gas generator, with this being due to the combustion taking place in the first gas generator. This corresponds to a first situation in which the first propellant is vaporized by the regenerative circuit, the first propellant then being referred to as a "regenerated propellant", while the second propellant is vaporized by the second heat exchanger as a result of the heat coming from the first gas generator. The means for controlling this first situation thus comprise the valves 66 and 72, which are open, and the valves 80 and 88, which are closed. These valves are controlled by any appropriate means, and in particular by an electronic control unit.

In FIG. 2, the engine 10 is inactive. It can be seen that the valves 22A and 30A are closed, such that the tanks are not delivering into the turbopumps 24 and 32. Nevertheless, the feed valves 66 and 72 are open, such that the first gas generator 60 is fed with both propellants. The tapping valve 80 is also open, such that the first heat exchanger 74 is fed with first propellant. Likewise, the tapping valve 88 is open, such that the second propellant is injected into the second gas generator 84. As a result, combustion takes place not only in the first gas generator, but also in the second gas generator as a result of the second propellant mixing with the exhaust 76 coming from the first gas generator. The second heat exchanger 90 is fed with second propellant by the tapping pipe 94.

Thus, the first propellant is heated and vaporized in the first heat exchanger 74 as a result of the combustion taking place in the first gas generator. The vaporized first propellant returns to the gas blanket in the first tank via the return pipe 82. The second propellant is heated and vaporized in the second heat exchanger 90 as a result of the combustion taking place in the second gas generator 84. The vaporized second propellant returns to the second tank 18 via the return pipe 100.

Under such conditions, although the engine 10 is not operating, the first tank continues to be pressurized by the first propellant being vaporized in the first heat exchanger co-operating with the gas generator. Instead of being dumped into the atmosphere, the exhaust fluid coming from the first gas generator is used to feed the second gas generator, thereby increasing the overall efficiency of the propulsion assembly. As a result, the desired pressure continues to be guaranteed in both tanks, for each of the two propellants.

The rate at which the first gas generator 60 is fed is adjusted firstly so that its exhaust contains a sufficient quantity of the first propellant for producing the heat needed to enable the second gas generator to operate by mixing with the second propellant injected into the second generator, and secondly so that the temperature of the gas at the outlet from the first gas generator remains higher than the dew point (no condensation) when the first heat exchanger 74 is active.

In the above-described example, the second gas generator is fed with first propellant solely by the exhausts fluid from the first gas generator. Nevertheless, provision could be made for an auxiliary feed pipe delivering first propellant to lead into the second gas generator. This pipe would then be provided with an authorization valve and would be used only when necessary.

The invention claimed is:

1. A device for pressurizing fuel tanks of a rocket engine, the device comprising
    a first heat exchanger for vaporizing a first propellant coming from a first tank prior to the vaporized first propellant being reintroduced into the first tank, and
    a second heat exchanger for vaporizing a second propellant coming from a second tank prior to the vaporized second propellant being reintroduced into the second tank, the first and second heat exchangers co-operating respectively with a first gas generator and a second gas generator configured to be fed with a mixture of the first and second propellants in order to produce combustion exhaust, and the second gas generator being arranged to be fed at least in part by the combustion exhaust from the first gas generator,
    said device further comprising a regenerative heat exchange circuit using the combustion heat from the rocket engine to vaporize the first propellant, referred to as the regenerated propellant,
    the device being configured for setting up a first situation in which the first gas generator is fed by the first and second tanks, while a first tapping pipe to the first heat exchanger for vaporizing the first propellant is deactivated and a second tapping pipe to the second heat exchanger for vaporizing the second propellant is activated.

2. The device as claimed in claim 1, wherein the first and second propellants feeding the gas generators are pressurized.

3. The device as claimed in claim 1, including first and second motor-driven pumps respectively a first tank outlet and a second tank outlet.

4. The device as claimed in claim 1, wherein, in the first situation, the second gas generator is fed solely by the combustion exhaust of the first gas generator.

5. The device as claimed in claim 1, configured for setting up a second situation in which the first gas generator is fed by the first and second tanks, the second gas generator is fed by the combustion exhaust of the first gas generator and by the second tank, and the first tapping pipe of the first heat exchanger and the second tapping pipe of the second heat exchanger are activated.

6. The device as claimed in claim 1, wherein the first gas generator is fed by a first feed pipe and by a second feed pipe respectively connected to the first and second tanks, while the second gas generator is fed firstly by an exhaust pipe of the first gas generator and secondly by a third feed pipe connected to the second tank.

7. The device as claimed in claim 6, wherein the third feed pipe is a branch connection on the second feed pipe.

8. The device as claimed in claim 7, wherein the third feed pipe is connected to the second feed pipe via a branch valve.

9. The device as claimed in claim 6, wherein the first heat exchanger is configured to be fed by the first tapping pipe connected to the first feed pipe, and the second heat exchanger is configured to be fed by the second tapping pipe connected to the second feed pipe.

10. The device as claimed in claim 9, wherein the first tapping pipe is connected to the first feed pipe via a tapping valve.

11. The device as claimed in claim 6, wherein feed valves are arranged respectively in the first and second feed pipes.

12. The device as claimed in claim 2, configured for setting up a second situation in which the first gas generator is fed by the first and second tanks, the second gas generator is fed by the combustion exhaust of the first gas generator and by the second tank, and the first tapping pipe of the first heat exchanger and the second tapping pipe of the second heat exchanger are activated.

* * * * *